United States Patent [19]
Benoit et al.

[11] Patent Number: 5,308,228
[45] Date of Patent: May 3, 1994

[54] GAS TURBINE BLADE COMPRISING LAYERS OF COMPOSITE MATERIAL

[75] Inventors: Joël M. D. Benoit, Cesson La Foret; Bruno J. G. Dambrine, Chartrettes; Laurent J. P. David, Limours; Patrick Fouche, Viry-Chatillon; Daniel G. Girault, Melun; Christophe G. R. Grosbois, Bagneux; Catherine L. F. Guet, Brunoy, all of France

[73] Assignee: Societe Nationale d'Etude et de Construction de Moteurs d'Aviation "S.N.E.C.M.A.", Paris, France

[21] Appl. No.: 982,945

[22] Filed: Nov. 30, 1992

[30] Foreign Application Priority Data
Dec. 4, 1991 [FR] France .................. 91 14984

[51] Int. Cl.⁵ ............................ F04D 29/38
[52] U.S. Cl. ............................ 416/230; 156/93
[58] Field of Search ............. 416/230, 226; 156/93

[56] References Cited

U.S. PATENT DOCUMENTS

| | | | |
|---|---|---|---|
| 2,692,219 | 10/1954 | Slayter et al. | 156/93 |
| 2,808,355 | 10/1957 | Christie et al. | 156/93 |
| 2,929,755 | 2/1960 | Porter | 416/230 R |
| 4,059,468 | 12/1977 | Bouillon | 156/93 |
| 4,331,495 | 5/1982 | Lackman et al. | 156/93 |
| 4,810,167 | 3/1989 | Spoltman et al. | 416/230 |
| 4,966,527 | 10/1990 | Merz | 416/230 |
| 5,123,814 | 6/1992 | Burdick et al. | 416/230 |

FOREIGN PATENT DOCUMENTS 1320539  6/1973  United Kingdom.
1500776  2/1978  United Kingdom.

OTHER PUBLICATIONS

CFRP Blades cut prop noise levels, Design News, Oct. 7, 1974 vol. 29, No. 19, p. 48.

Primary Examiner—Edward K. Look
Assistant Examiner—Mark Sgantzos
Attorney, Agent, or Firm—Oblon, Spivak, McClelland, Maier & Neustadt

[57] ABSTRACT

A gas turbine blade includes a central core covered by a plurality of layers of composite material, and optionally also an outer sleeve of woven composite material. A network of transverse seams pass through the layers of composite material, and preferably also the core and the outer sleeve. This construction is particularly applicable to large diameter turbine blades.

2 Claims, 2 Drawing Sheets

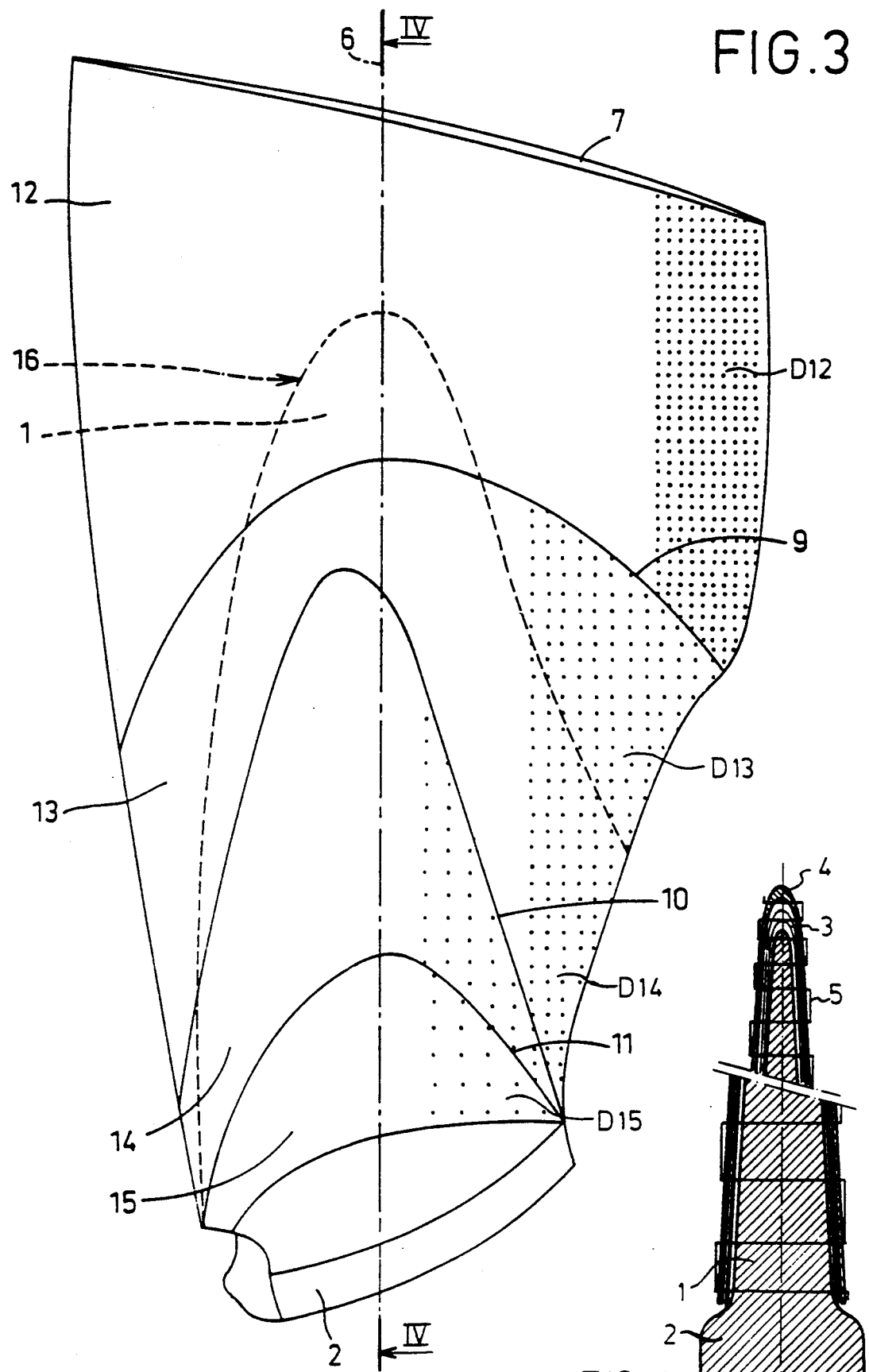

GAS TURBINE BLADE COMPRISING LAYERS OF COMPOSITE MATERIAL

BACKGROUND OF THE INVENTION

Field of the Invention

With a view to improving both performance and size, the current trend in aircraft gas turbine engine development is towards greater use of composite materials.

Discussion of the Background

In particular, engines equipped with large diameter blade systems will comprise blades made wholly or partially from composite materials, and the same may be envisaged for compressor blades which are subject to very high temperatures, such as for example in supersonic engines.

Each blade made from composite materials is in fact constituted by an assembly of a number of elementary components, namely layers of composite materials, either woven or non-woven, in which, in the case of woven layers, the weave and constitution may sometimes be different, and a central core, the variety of which is likely to render the finished product heterogeneous.

SUMMARY OF THE INVENTION

It is an object of the invention to provide a novel structure for a blade made of composite materials which ensures excellent mechanical strength in each assembled blade and improves the strength and behavior of the blade under impact.

According to the invention, there is provided a gas turbine blade comprising a central core, a plurality of layers of composite material covering said central core, and a network of transverse seams passing through at least said layers of composite material.

The blade may further comprise a sleeve which is made from a woven composite material and which has an open end and a closed end, the sleeve receiving the whole of the central core and the layers of composite material covering the core, and the network of transverse seams also passing through the sleeve.

The central core may itself be made from a composite material, and the transverse seams may also pass through the core.

Preferably the blade comprises an aerodynamic part and a fixing root in a known manner, and the density of the stitches of the seams is greater in the region of the aerodynamic part which is farthest from the fixing root than it is in the region of the aerodynamic part which is closest to the fixing root.

The main advantage of blades constructed in accordance with the invention is that there is a substantial increase in their mechanical strength and an improvement in their impact resistance, thus making it possible for them to be used in gas turbine having high performance and/or large diameter blades.

The invention will be better understood, and further features and advantages will become apparent, from the following description of a preferred embodiment, which is given only by way of example, with reference to the accompanying drawings.

BRIEF DESCRIPTION OF THE DRAWINGS

FIG. 3 is a perspective view of the blade shown in FIGS. 1 and 2 but which shows the density of the stitches.

FIG. 4 shows a sleeve in a cross-sectional view taken along line IV—IV in FIG. 3, the sleeve having an open end and a closed end.

DESCRIPTION OF THE PREFERRED EMBODIMENT

Figure 1:
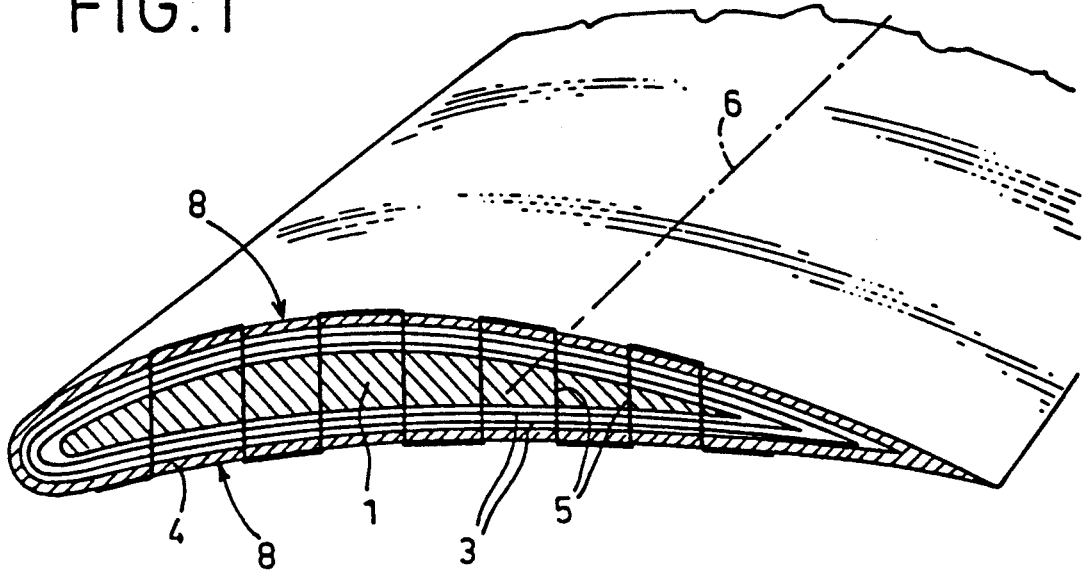
FIG. 1 is a cross-sectional view through one embodiment of a blade in accordance with the invention.
Figure 2:
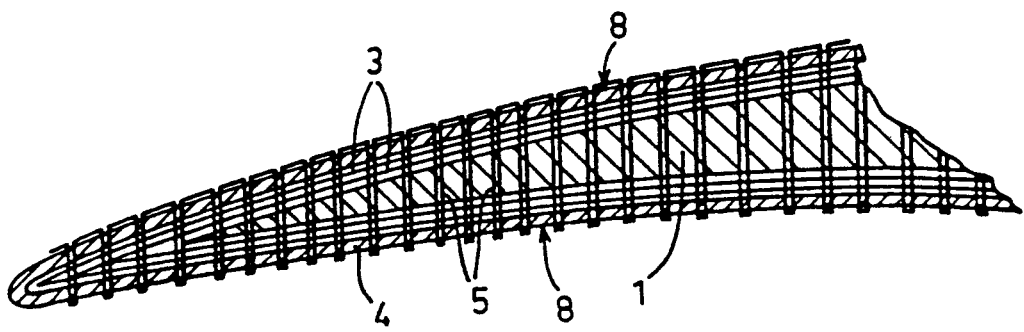
FIG. 2 is an enlarged view of a part of the blade depicted in FIG. 1.

The turbomachine blade shown in the drawings comprises:

a central core 1 which, in this embodiment, includes a root 2 for fixing the blade;

a plurality of layers 3 of a woven material applied to the outer face of the central core, but not covering the fixing root 2; and a sleeve 4 which is made of a woven composite material and which is open at one end and closed at the other, as shown in FIG. 4, the sleeve covering the whole of the layers 3 as far as the fixing root 2, which is not included.

The central core 1 (including the fixing root 2) is made from a composite material. In one example the core may be formed by a superpositioning of a plurality of elementary layers of fiber materials (carbon fibers, glass fibers, or fibers of a similar material) pre-impregnated with resin. In another example, the central core 1 may be made by injection of resin into a mold with or without woven fibrous structures being introduced into the mold prior to injection of the resin. The central core may furthermore comprise inserts of a non-resinous nature: for example of foam or a metallic material (in some embodiments, these may be metal longitudinal members). The central core may be produced by a three-directional weave. Three-dimensional or multi-directional weaves are referenced as 3D (with three perpendicular directions, two by two); 3X (with one direction perpendicular to the other two, such structures being produced especially by Societe BROCHIER S.A.); and 2.5D (two perpendicular directions, plus a third, as in COTTON structures designed by Societe AEROSPATIALE).

The layers 3 are likewise made from woven composite materials, particularly from fibers pre-impregnated with resin. These fibers may be organic fibers (e.g. of carbon or aramide), ceramic fibers (e.g. of glass or silicon carbide) or metallic fibers. The fibers are used either dry, with no impregnation matrix, or they are pre-impregnated, such as with epoxy resins, PMR15, thermoplastic resins, ceramic or vitroceramic resins, etc. The weaves used may be bi-directional, as in satin, serge, taffeta and the like. The structures adopted may also be three-directional or multi-directional. Uni-directional structures, in which the fibers are all orientated in the same direction, may also be used, particularly in the construction of the central core 1.

In some embodiments, the sleeve 4 may be knitted, preferably from resin impregnated fibers.

The assembly of elementary structures comprising the central core 1, the layers 3 and the sleeve 4 constitutes a multi-directional structure, and the bond between these elementary structures is provided by threads of seams 5 which pass through the various structures in a transverse direction relative to the general longitudinal axis 6 of the blade which extends from the fixing root 2 to the tip 7 of the blade. The threads 5 are disposed in directions which are substantially at right-angles to the outer surfaces 8 of the blade. The seam threads 5 may be made of fibers of the same type as the fibers of the layers 3: namely organic fibers (e.g. of carbon or aramide); ceramic fibers (e.g. of glass or silicone carbinde); or metallic fibers. The assembled structure may then be impregnated and polymerized in a mold in order to obtain the end product. Alternatively the structure may be placed dry into a mold and resin then injected into it in order to obtain the finished article.

In FIG. 3, the curves 9,10,11 represent division of the blade, in the longitudinal direction, into four zones 12,13,14 and 15 between its tip 7 and the fixing root 2. The outline of the central core 1 is shown by the dotted line 16. In each zone 12,13,14,15, the seam stitches are of a specific density D12,D13,D14,D15, the density decreasing from the zone 12 closest to the tip 7 to the zone 15 adjacent the fixing root 2: i.e. D12 D13 D14 and D15.

By way of example, the following blade constructions make it possible to obtain lightweight and mechanically strong blades:

A central core 1 made from a 3D weave of carbon fibers, bi-directional layers of carbon fibers and then bi-directional layers of glass fibers applied to the core, and carbon fiber seams;

A central core 1, 3D layers of carbon fibers, then bi-directional layers of carbon fibers followed by bi-directional layers of glass fibers applied to the core, and seam threads of aramide or carbon;

A central core 1 including longitudinal metal members, 2.5D layers of carbon fibers then bi-directional layers of glass fibers applied to the core, and seams of carbon fibers;

A central core 1 made from 2.5D weaving of carbon fibers, 2.5D layers of carbon fibers then bi-directional layers of carbon fibers applied to the core, a sleeve knitted from glass fibers applied to the carbon fiber layers, and seams of carbon fibers.

The blades obtained are lighter than wholly metallic blades and offer excellent mechanical strength, both with respect to centrifugal stresses, and also impacts, including when they are exposed to elevated temperatures.

It will of course be appreciated that the invention is not limited to the embodiment shown nor to those which have been described, but embraces all alternatives which may be made thereto without departing from the scope of the following claims.

We claim:

1. A gas turbine blade comprising:
   a central core and a fixing root forming an integral, monolithic single part of the blade, a plurality of layers of a first composite material covering said central core, and a network of transverse seams passing through at least said layers of composite material; and
   a sleeve made from a woven composite material, said sleeve having an open end and a closed end and which receives said central core and said layers of composite material covering said core, said network of transverse seams also passing through said sleeve wherein said central core is made from a second composite material and said transverse seams also pass through said core.

2. A blade according to claim 1, wherein said blade comprises an aerodynamic part, and wherein the density of the stitches of said seams is greater in the area of said aerodynamic part which is furthest from said fixing root than that in the area of said aerodynamic part which is closest to said fixing root.

* * * * *